United States Patent
Takeuchi et al.

(10) Patent No.: US 10,151,255 B2
(45) Date of Patent: Dec. 11, 2018

(54) CONTROL DEVICE FOR INTERNAL-COMBUSTION ENGINE, AND CONTROL METHOD FOR INTERNAL-COMBUSTION ENGINE

(71) Applicant: HONDA MOTOR CO., LTD., Tokyo (JP)

(72) Inventors: Masahiro Takeuchi, Wako (JP); Koichiro Shinozaki, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 60 days.

(21) Appl. No.: 15/406,783

(22) Filed: Jan. 16, 2017

(65) Prior Publication Data

US 2017/0218861 A1 Aug. 3, 2017

(30) Foreign Application Priority Data

Jan. 29, 2016 (JP) ................................. 2016-016256

(51) Int. Cl.
| | |
|---|---|
| F02D 41/00 | (2006.01) |
| F02B 75/20 | (2006.01) |
| F02D 23/00 | (2006.01) |
| F02B 37/18 | (2006.01) |

(52) U.S. Cl.
CPC .......... *F02D 41/0007* (2013.01); *F02B 37/18* (2013.01); *F02B 75/20* (2013.01); *F02D 23/00* (2013.01); *F02D 2200/0404* (2013.01); *F02D 2200/0408* (2013.01); *Y02T 10/144* (2013.01)

(58) Field of Classification Search
None
See application file for complete search history.

(56) References Cited

U.S. PATENT DOCUMENTS

| | | | | | |
|---|---|---|---|---|---|
| 4,691,521 | A | * | 9/1987 | Hirabayashi | F02B 37/18 60/602 |
| 4,702,080 | A | * | 10/1987 | Ueno | F02B 37/18 60/602 |
| 5,546,795 | A | * | 8/1996 | Yamagishi | F02D 41/0007 73/114.33 |

FOREIGN PATENT DOCUMENTS

JP 2005-155506 6/2005

* cited by examiner

*Primary Examiner* — Mark A Laurenzi
*Assistant Examiner* — Wesley G Harris
(74) *Attorney, Agent, or Firm* — Mori & Ward, LLP

(57) ABSTRACT

A control device for an internal-combustion engine includes circuitry. The circuitry is configured to calculate, in accordance with an operating state of the internal-combustion engine, a basic supercharging pressure of intake gas generated by a supercharger provided in the internal-combustion engine. The circuitry is configured to acquire a flow rate change state parameter that correlates with a change state of the flow rate of the intake gas controlled by a flow rate control mechanism provided in the internal-combustion engine. The circuitry is configured to calculate a correction value in accordance with the flow rate change state parameter. The circuitry is configured to calculate an estimated supercharging pressure of the intake gas by correcting the basic supercharging pressure with the correction value. The circuitry is configured to control operation of the internal-combustion engine using the estimated supercharging pressure.

9 Claims, 6 Drawing Sheets

CONTROL DEVICE FOR INTERNAL-COMBUSTION ENGINE, AND CONTROL METHOD FOR INTERNAL-COMBUSTION ENGINE

CROSS-REFERENCES TO RELATED APPLICATIONS

The present application claims priority under 35 U.S.C. § 119 to Japanese Patent Application No. 2016-016256, filed Jan. 29, 2016, entitled "Control Device for Internal-combustion Engine." The contents of this application are incorporated herein by reference in their entirety.

BACKGROUND

1. Field

The present disclosure relates to a control device for an internal-combustion engine and a control method for an internal-combustion engine.

2. Description of the Related Art

Hitherto, a control device for an internal-combustion engine described in Japanese Unexamined Patent Application Publication No. 2005-155506 has been known. This internal-combustion engine includes a variable compression ratio mechanism that changes the compression ratio of the internal-combustion engine, and a turbocharger that can change the supercharging pressure. This control device controls the compression ratio of the internal-combustion engine by a control method shown in FIG. 4 of the same publication.

That is, first, a target load, a steady-state reach supercharging pressure, and a supercharging delay time constant are calculated in accordance with the accelerator opening degree and the engine speed. Then, an estimated supercharging pressure is calculated by using the steady-state reach supercharging pressure and the supercharging delay time constant with a primary delay arithmetic expression, and an actual load is calculated on the basis of the target load, the steady-state reach supercharging pressure, and the estimated supercharging pressure. Also, a target compression ratio is calculated in accordance with the actual load and the engine speed to prevent a knocking from occurring, and the compression ratio of the internal-combustion engine is controlled to meet the target compression ratio through the variable compression ratio mechanism.

SUMMARY

According to one aspect of the present invention, a control device for an internal-combustion engine includes a supercharger that can change a supercharging pressure of intake gas, and a flow rate change mechanism that can change a flow rate of the intake gas. The control device includes a basic estimated supercharging pressure calculating unit that calculates a basic estimated supercharging pressure in accordance with an operating state of the internal-combustion engine; a flow rate change state parameter acquiring unit that acquires a flow rate change state parameter that correlates with a change state of the flow rate of the intake gas by the flow rate change mechanism; a correction value calculating unit that calculates a correction value in accordance with the flow rate change state parameter; an estimated supercharging pressure calculating unit that calculates an estimated supercharging pressure being an estimated value of the supercharging pressure by correcting the basic estimated supercharging pressure with the correction value; and a control unit that controls operation of the internal-combustion engine by using the estimated supercharging pressure.

According to another aspect of the present invention, a control device for an internal-combustion engine includes circuitry. The circuitry is configured to calculate, in accordance with an operating state of the internal-combustion engine, a basic supercharging pressure of intake gas generated by a supercharger provided in the internal-combustion engine. The circuitry is configured to acquire a flow rate change state parameter that correlates with a change state of the flow rate of the intake gas controlled by a flow rate control mechanism provided in the internal-combustion engine. The circuitry is configured to calculate a correction value in accordance with the flow rate change state parameter. The circuitry is configured to calculate an estimated supercharging pressure of the intake gas by correcting the basic supercharging pressure with the correction value. The circuitry is configured to control operation of the internal-combustion engine using the estimated supercharging pressure.

According to further aspect of the present invention, a control method for an internal-combustion engine includes calculating, in accordance with an operating state of the internal-combustion engine, a basic supercharging pressure of intake gas generated by a supercharger provided in the internal-combustion engine in accordance with an operating state of the internal-combustion engine. A flow rate change state parameter that correlates with a change state of the flow rate of the intake gas controlled by a flow rate control mechanism provided in the internal-combustion engine is acquired. A correction value is calculated in accordance with the flow rate change state parameter. An estimated supercharging pressure of the intake gas is calculated by correcting the basic supercharging pressure with the correction value. Operation of the internal-combustion engine is controlled using the estimated supercharging pressure.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 7A shows an example of a control result for a target intake pressure and a target supercharging pressure. FIG. 7B shows an example of a control result for an estimated intake pressure and an estimated supercharging pressure.

DESCRIPTION OF THE EMBODIMENTS

Figure 1:
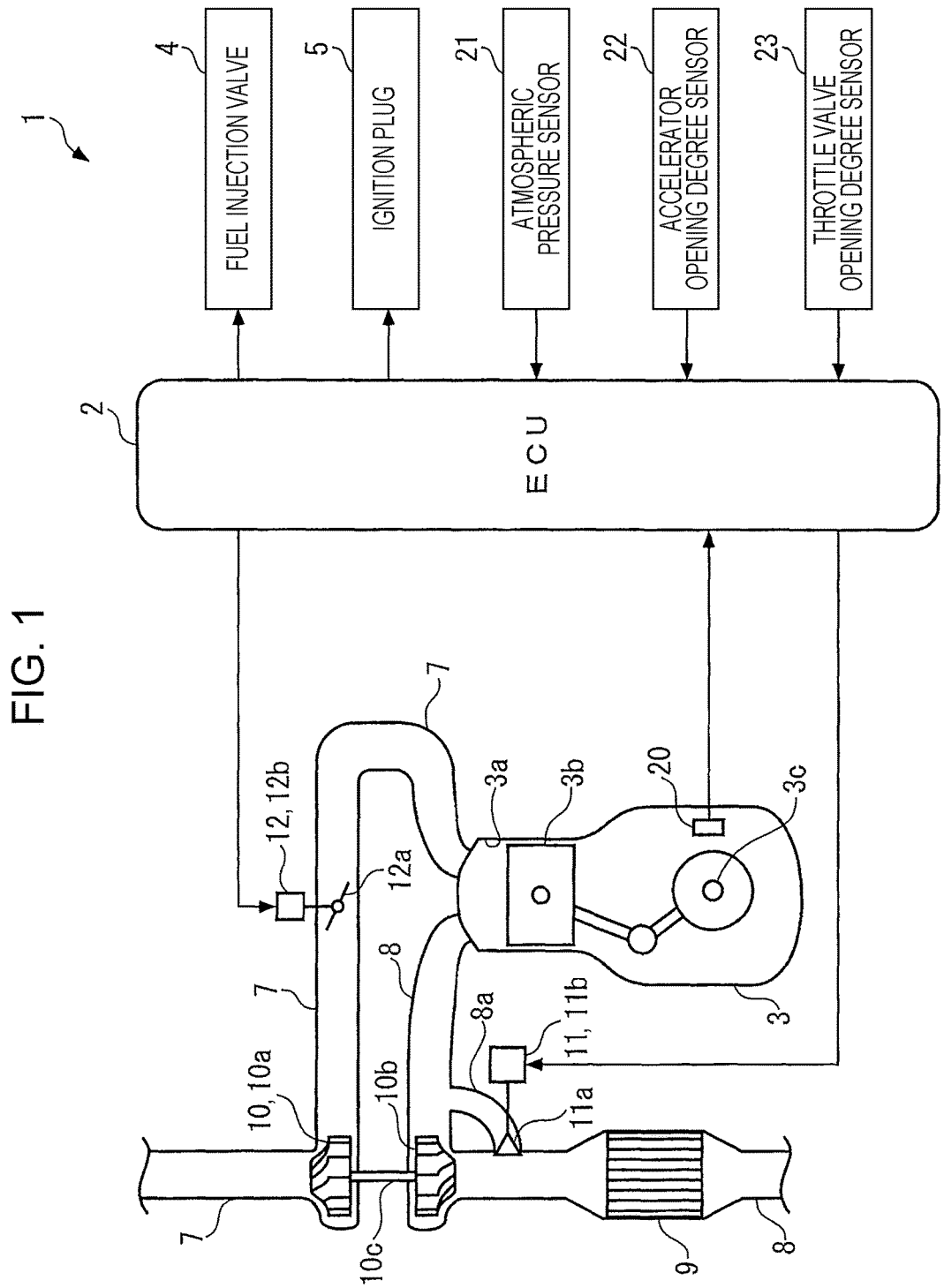
FIG. 1 is an illustration schematically showing a configuration of a control device and a configuration of an internal-combustion engine to which the control device is applied according to an embodiment of the application.

The embodiment(s) will now be described with reference to the accompanying drawings, wherein like reference numerals designate corresponding or identical elements throughout the various drawings.

A control device for an internal-combustion engine according to an embodiment of the application is described below with reference to the drawings. As shown in FIG. 1, a control device 1 is applied to an internal-combustion engine (hereinafter, referred to as "engine") 3, and includes an engine control unit (ECU) 2 (circuitry 2). The ECU 2 executes intake control processing and other processing (described later).

The engine 3 is in-line multi-cylinder type including a plurality of pairs of cylinders 3a and pistons 3b (only one pair is shown). The engine 3, as a power source, is mounted on a vehicle (not shown). The engine 3 is provided with a fuel injection valve 4 and an ignition plug 5 for each cylinder 3a (only one valve and only one plug are shown). The fuel injection valve 4 is electrically connected with the ECU 2, and its open valve period and open valve timing, that is, its fuel injection amount and fuel injection timing are controlled by the ECU 2. The ignition plug 5 is also electrically connected with the ECU 2, and its ignition timing is controlled by the ECU 2.

Also, the engine 3 is provided with a crank angle sensor 20. The crank angle sensor 20 outputs a CRK signal being a pulse signal to the ECU 2 when a crank shaft 3c rotates. A single pulse of the CRK signal is output every predetermined crank angle (for example, 2°). The ECU 2 calculates the number of rotations (hereinafter, referred to as "engine speed") NE of the engine 3 on the basis of the CRK signal.

In an intake path 7 of the engine 3, a turbocharger 10 (a supercharger) and a throttle valve mechanism 12 (a flow rate change mechanism, a flow rate control mechanism) are provided in that order from the upstream side. The turbocharger 10 includes a compressor 10a provided in the middle of the intake path 7, a turbine 10b provided in the middle of an exhaust path 8, a shaft 10c that integrally couples the compressor 10a and the turbine 10b together, and a waste gate valve mechanism 11.

In the turbocharger 10, when the turbine 10b is rotationally driven by exhaust gas in the exhaust path 8, the compressor 10a rotates together with the turbine 10b, and hence intake gas in the intake path 7 is compressed. That is, supercharging operation is executed.

Also, the waste gate valve mechanism 11 includes a waste gate valve 11a and a WG actuator 11b that drives the waste gate valve 11a. The waste gate valve 11a opens and closes a bypass 8a that bypasses the turbine 10b in the exhaust path 8, and is provided at an opening at which a downstream-side end portion of the bypass 8a meets the exhaust path 8. The waste gate valve 11a changes the opening degree, and hence changes the flow rate of exhaust gas that bypasses the turbine 10b and flows in the bypass 8a, or in other words, the flow rate of exhaust gas that drives the turbine 10b. Accordingly, the supercharging pressure is changed.

Further, the WG actuator 11b is electric type electrically connected with the ECU 2. The WG actuator 11b is supplied with a control input signal from the ECU 2, and hence steplessly changes the opening degree of the waste gate valve 11a. Consequently, the supercharging pressure is controlled.

Also, an exhaust gas cleaning catalyst 9 is provided downstream of the compressor 10a in the exhaust path 8. The exhaust gas cleaning catalyst 9 is a ternary catalyst type.

The throttle valve mechanism 12 includes a throttle valve 12a and a TH actuator 12b that drives the throttle valve 12a to open and close the throttle valve 12a. The throttle valve 12a is rotatably provided in the middle of the intake path 7.

The throttle valve 12a changes the flow rate of the intake gas passing through the throttle valve 12a in accordance with the change in opening degree caused by the rotation.

The TH actuator 12b is a combination of a motor connected with the ECU 2 and a gear mechanism (not shown). The TH actuator 12b is controlled by a control input signal from the ECU 2, and hence causes the opening degree of the throttle valve 12a to be changed.

Further, an atmospheric pressure sensor 21, an accelerator opening degree sensor 22, and a throttle valve opening degree sensor 23 are electrically connected with the ECU 2. The atmospheric pressure sensor 21 is configured of a semiconductor pressure sensor. The atmospheric pressure sensor 21 detects an atmospheric pressure PA, and outputs a detection signal indicative of the detected atmospheric pressure PA to the ECU 2.

Also, the accelerator opening degree sensor 22 detects an accelerator opening degree AP being an operation amount of an accelerator pedal (not shown), and outputs a detection signal indicative of the detected accelerator opening degree AP to the ECU 2. Further, the throttle valve opening degree sensor 23 detects an opening degree (hereinafter, referred to as "throttle valve opening degree") TH of the throttle valve 12a, and outputs a detection signal indicative of the throttle valve opening degree TH to the ECU 2.

The ECU 2 is configured of a microcomputer including a CPU, a RAM, a ROM, and an I/O interface (not shown). The ECU 2 executes intake control processing and other processing (described later) in accordance with detection signals of the above-described various sensors 20 to 23.

In this embodiment, the ECU 2 corresponds to a basic estimated supercharging pressure calculating unit, a flow rate change state parameter acquiring unit, a correction value calculating unit, an estimated supercharging pressure calculating unit, a control unit, an estimated intake pressure calculating unit, and a target supercharging pressure setting unit.

The intake control processing executed by the ECU 2 is described below with reference to FIG. 2. The intake control processing controls the turbocharger 10 and the throttle valve mechanism 12, and hence controls an intake air amount being the flow rate of the intake gas. The control is executed every predetermined control period $\Delta T$ (for example, 10 msec).

It is assumed that various values calculated (or sampled) in the following description are stored in the RAM of the ECU 2. Also, each piece of discrete data with a sign (k) indicates data calculated in synchronization with the aforementioned control period $\Delta T$. Sign k (k is a positive integer) indicates the order of the calculation cycle of each piece of discrete data. For example, sign k indicates the value calculated at a current control timing (hereinafter, referred to as "current value") and sign k−1 indicates the value calculated at a previous control timing (hereinafter, referred to as "previous value"). This point is similar for discrete data described later. In the following description, the sign (k) in each piece of discrete data is occasionally appropriately omitted.

Figure 2:
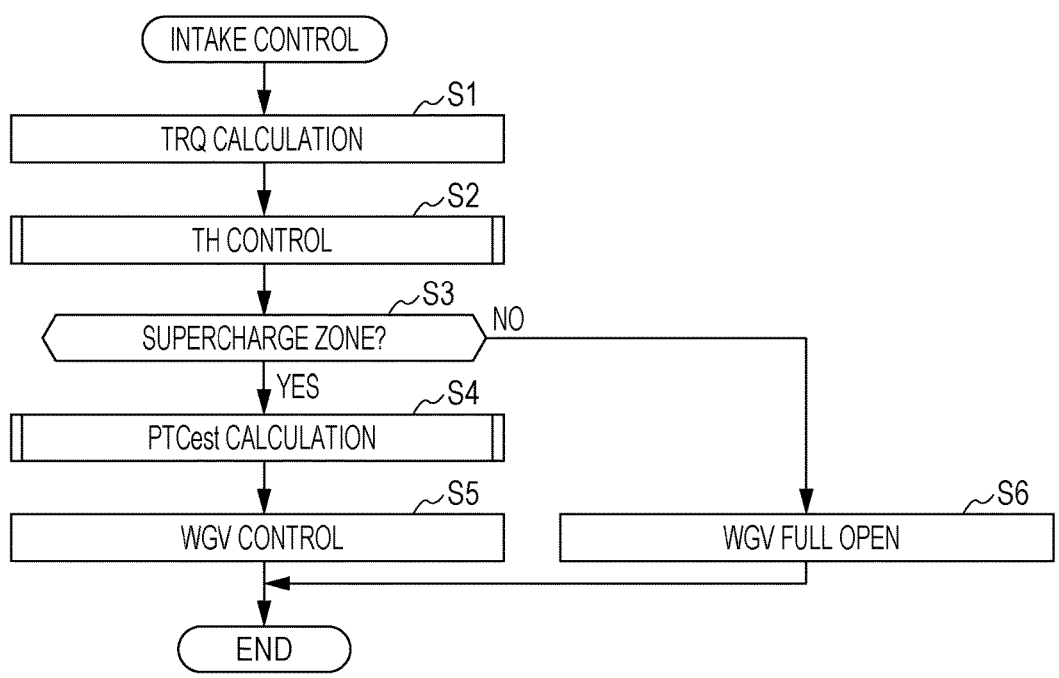
FIG. 2 is a flowchart showing contents of intake control processing.

As shown in FIG. 2, first, in step 1 (in the drawing, step 1 is abbreviated as "S" which will be similar for the following description), retrieval is made from a map (not shown) in accordance with the engine speed NE and the accelerator opening degree AP, and hence a request torque TRQ is calculated. The request torque TRQ corresponds to a torque requested to the engine 3.

Then, in step 2, TH control processing is executed. In the case of the TH control processing, the throttle valve opening degree TH is controlled (not shown, described later). First, retrieval is made from a map (not shown) in accordance with the engine speed NE and the request torque TRQ, hence a target opening degree THcmd is calculated, and a value of a control input signal is calculated so that the throttle valve opening degree TH meets the target opening degree THcmd. Then, a control input signal corresponding to the calculated control input signal is supplied to the TH actuator 12b, and hence the throttle valve opening degree TH is controlled to meet the target opening degree THcmd.

Then, supercharging control processing is executed in steps 3 to 6 described below. First, in step 3, it is judged whether or not the operating zone of the engine 3 is a supercharging zone. To be specific, retrieval is made from a map (not shown), and it is judged whether or not the combination of the engine speed NE and the request torque TRQ is in a predetermined supercharging zone.

If the judgment result in step 3 is NO, that is, if the operating zone of the engine 3 is not in the supercharging zone, it is judged that natural intake operation of the engine 3 should be executed. The processing goes to step 6, the waste gate valve (in the drawing, indicated as "WGV") 11a is controlled to be in a full open state, and then the processing is ended.

Figure 3:
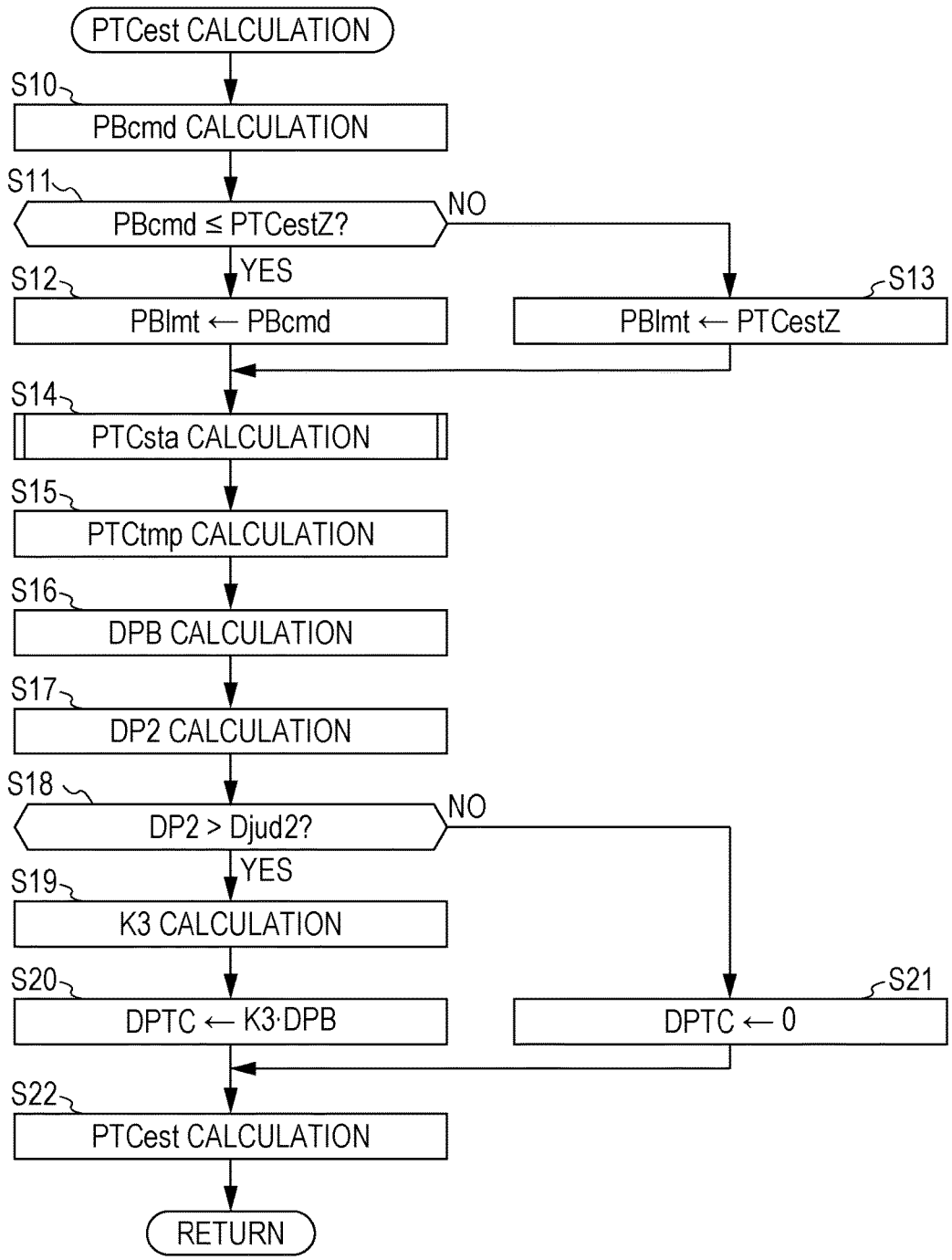
FIG. 3 is a flowchart showing calculation processing of an estimated supercharging pressure.

In contrast, if the judgment result in step 3 is YES and the operating zone of the engine 3 is in the supercharging zone, it is judged that the supercharging operation by the turbocharger 10 should be executed. The processing goes to step 4, and an estimated supercharging pressure PTCest is calculated. The estimated supercharging pressure PTCest is an estimated value of the supercharging pressure, and is specifically calculated as shown in FIG. 3.

As shown in the drawing, first in step 10, retrieval is made from a map (not shown) in accordance with the engine speed NE and the request torque TRQ, and hence a target intake pressure PBcmd is calculated. The target intake pressure PBcmd corresponds to a target value of an intake pressure being a pressure of intake gas in an intake manifold.

Then, the processing goes to step 11, and it is judged whether or not the target intake pressure PBcmd is equal to or lower than a previous value PTCestZ of the estimated supercharging pressure. The previous value PTCestZ of the estimated supercharging pressure is an estimated supercharging pressure value PTCest(k−1) calculated at the previous control timing. If the judgment result is YES, the processing goes to step 12, and a limit intake pressure PBlmt is set at the target intake pressure PBcmd.

In contrast, if the judgment result in step 11 is NO and PBcmd>PTCestZ, the processing goes to step 13, and the limit intake pressure PBlmt is set at the previous value PTCestZ of the estimated supercharging pressure. In this way, the limit intake pressure PBlmt is calculated as a value obtained by executing limit processing of providing the previous value PTCestZ of the estimated supercharging pressure as the upper limit on the target intake pressure PBcmd, because it is estimated that the intake pressure higher than the previous value PTCestZ of the estimated supercharging pressure cannot be provided.

Figure 4:
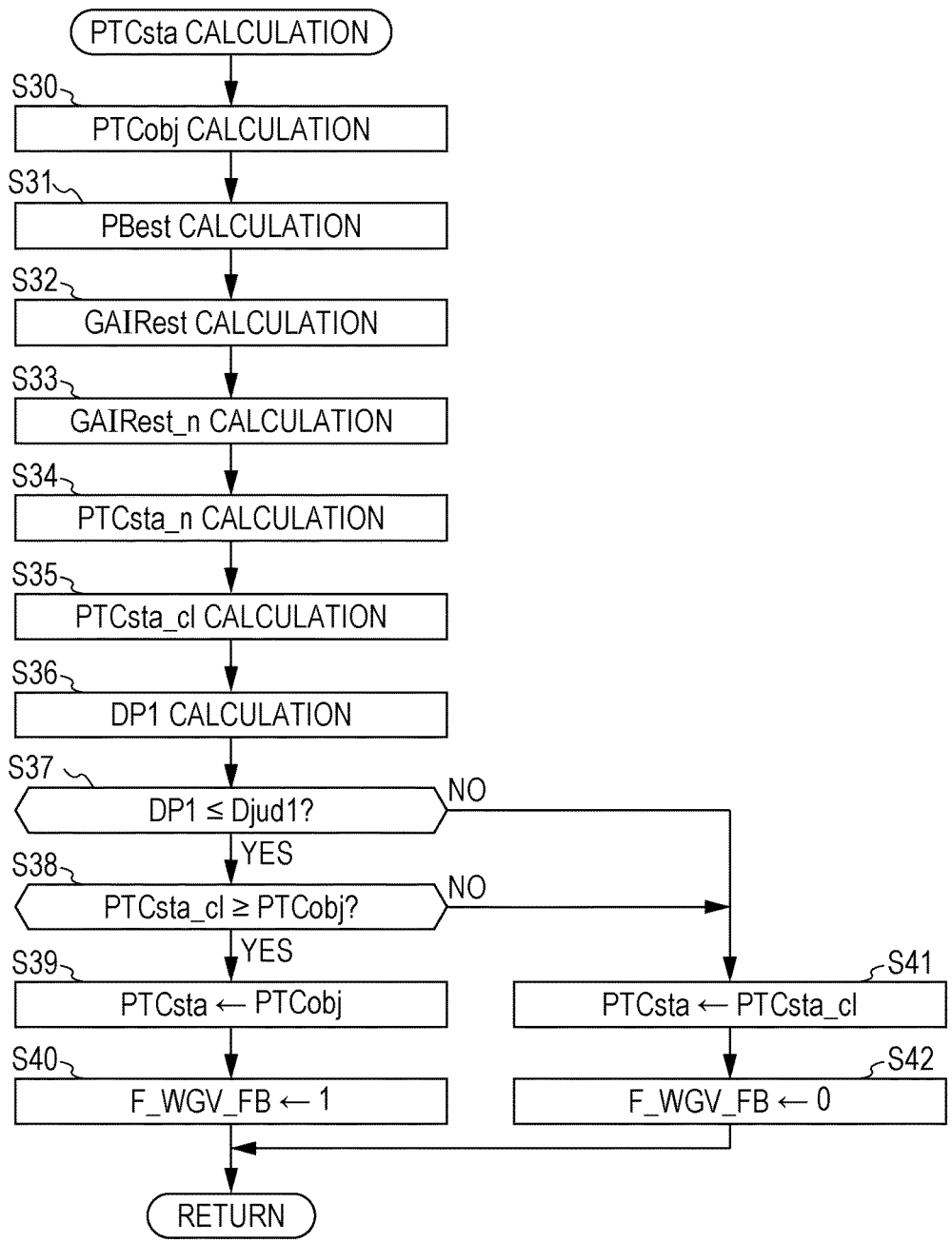
FIG. 4 is a flowchart showing calculation processing of a steady-state reach supercharging pressure.

In step 14 subsequent to step 12 or 13, a steady-state reach supercharging pressure PTCsta is calculated. The steady-state reach supercharging pressure PTCsta is a maximum value of a supercharging pressure that can be realized when the waste gate valve 11a is controlled in a full closed state in an operating state of the engine 3 and under an environmental condition (that is, an atmospheric pressure PA) at the current time point. To be specific, the value is calculated as shown in FIG. 4.

As shown in the drawing, first, in step 30, retrieval is made from a map (not shown) in accordance with the limit intake pressure PBlmt, and hence a target supercharging pressure PTCobj is calculated.

Then, the processing goes to step 31, and an estimated intake pressure PBest is calculated by primary delay filtering arithmetic operation shown in Expression (1) as follows. The estimated intake pressure PBest is an estimated value of the intake pressure.

$$PBest(k) = K1 \cdot PBlmt(k) + (1-K1) \cdot PBest(k-1) \quad (1)$$

K1 in Expression (1) is a weighting factor set so that $0<K1<1$ is established. By using Expression (1), the estimated intake pressure PBest is calculated as a value that reflects a response delay of the throttle valve mechanism 12 and a waste time until the intake gas flows into the intake manifold from the throttle valve 12a when the throttle valve mechanism 12 is controlled so that the intake pressure meets the limit intake pressure PBlmt.

Then, in step 32, retrieval is made from a map (not shown) in accordance with the engine speed NE and the estimated intake pressure PBest, and hence an estimated intake air amount GAIRest is calculated. The estimated intake air amount GAIRest is an estimated value of the amount of intake gas flowing into the intake manifold at the current control time point.

In step 33 subsequent to step 32, a level ground equivalent value GAIRest_n of the estimated intake air amount is calculated with Expression (2) as follows.

$$GAIRest\_n(k) = GAIRest(k) \cdot PAref/PA(k) \quad (2)$$

PAref in Expression (2) is a level ground equivalent value (760 mmHg) of the atmospheric pressure. As it is found from Expression (2), the level ground equivalent value GAIRest_n of the estimated intake air amount is obtained by converting the estimated intake air amount GAIRest into a value at the level ground.

Figure 5:
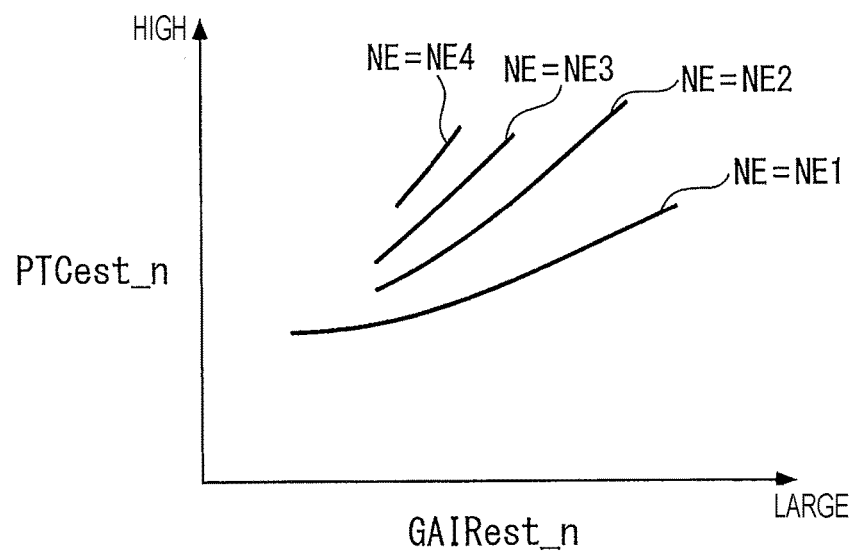
FIG. 5 is an illustration showing an example of a map used for calculating a level ground equivalent value of the steady-state reach supercharging pressure.

Then, the processing goes to step 34, retrieval is made from a map shown in FIG. 5 in accordance with the engine speed NE and the level ground equivalent value GAIRest_n of the estimated intake air amount, and hence a level ground equivalent value PTCsta_n of the steady-state reach supercharging pressure is calculated. NE1 to NE4 in the drawing are predetermined values of the engine speed NE set so that NE1<NE2<NE3<NE4 is established.

As shown in the drawing, the level ground equivalent value PTCsta_n of the steady-state reach supercharging pressure is set at a higher value as the engine speed NE is higher or as the level ground equivalent value GAIRest_n of the estimated intake air amount is larger. This is because the maximum supercharging pressure that can be realized by the turbocharger 10 is higher as the engine speed NE is higher or the level ground equivalent value GAIRest_n of the estimated intake air amount is larger.

Then, in step 35, a closed valve value PTCsta_cl of the steady-state reach supercharging pressure is calculated with Expression (3) as follows.

$$PTCsta\_cl(k) = PTCsta\_n(k) \cdot \frac{PA(k)}{PAref} \quad (3)$$

As it is found from Expression (3), the closed valve value PTCsta_cl of the steady-state reach supercharging pressure is a value obtained by converting the level ground equivalent value PTCsta_n of the steady-state reach supercharging pressure into an equivalent value with the atmospheric pressure PA at the current time point.

In step 36 subsequent to step 35, a first pressure deviation DP1 is calculated with Expression (4) as follows.

$$DP1(k)=|PTCest(k-1)-PTCobj(k-1)| \qquad (4)$$

Then, the processing goes to step 37, and it is judged whether or not the first pressure deviation DP1 is a first judgment value Djud1 or smaller. The first judgment value Djud1 is a predetermined value for judging whether or not DP1≈0, that is, PTCest(k−1)≈PTCobj(k−1) is established.

If the judgment result in step 37 is YES and PTCest(k−1)≈PTCobj(k−1) is established, the processing goes to step 38, and it is judged whether or not the closed valve value PTCsta_cl of the steady-state reach supercharging pressure is the target supercharging pressure PTCobj or higher.

If the judgment result is YES, it is judged that the target supercharging pressure PTCobj can be realized by controlling the opening degree of the waste gate valve 11a. The processing goes to step 39, and the steady-state reach supercharging pressure PTCsta is set at the target supercharging pressure PTCobj.

Then, the processing goes to step 40, a WGV feedback flag F_WGV_FB is set at "1" to indicate that feedback control of the waste gate valve 11a should be executed. Then, this processing is ended.

In contrast, if the judgment result in step 37 or step 38 is NO, that is, if the difference between the previous value PTCest(k−1) of the estimated supercharging pressure and the previous value PTCobj(k−1) of the target supercharging pressure is large, or if PTCsta_cl<PTCobj is established and the target supercharging pressure PTCobj cannot be realized although the opening degree of the waste gate valve 11a is controlled to be in the full closed state, the processing goes to step 41, and the steady-state reach supercharging pressure PTCsta is set at the closed valve value PTCsta_cl of the steady-state reach supercharging pressure.

Then, the processing goes to step 42, the WGV feedback flag F_WGV_FB is set at "0" to indicate that the feedback control of the waste gate valve 11a should be stopped and the waste gate valve 11a should be controlled to be in the full closed state. Then, the processing is ended.

Referring back to FIG. 3, the steady-state reach supercharging pressure PTCsta is calculated as described above in step 14, then the processing goes to step 15, and a temporary value PTCtmp of the estimated supercharging pressure (basic estimated supercharging pressure, basic supercharging pressure) is calculated by primary delay filtering arithmetic operation indicated by Expression (5) as follows.

$$PTCtmp(k)=K2 \cdot PTCsta(k)+(1-K2) \cdot PTCtmp(k-1) \qquad (5)$$

K2 in Expression (5) is a weighting factor set so that 0<K2<1 is established. By using Expression (5), the temporary value PTCtmp of the estimated supercharging pressure is calculated as a value that reflects a response delay of the turbocharger 10 when the turbocharger 10 is controlled so that the supercharging pressure meets the steady-state reach supercharging pressure PTCsta.

Then, in step 16, an estimated intake pressure change amount DPB (a flow rate change state parameter) is calculated with Expression (6) as follows.

$$DPB(k)=PBest(k-1)-PBest(k) \qquad (6)$$

In step 17 subsequent to step 16, a second pressure deviation DP2 (a difference) is calculated with Expression (7) as follows.

$$DP2(k)=|PTCest(k-1)-PBest(k-1)| \qquad (7)$$

Then, the processing goes to step 18, and it is judged whether or not the second pressure deviation DP2 is larger than a second judgment value Djud2. The second judgment value Djud2 is a value for judging whether or not DP2≈0, that is, PTCest(k−1)≈PBest(k−1) is established.

Figure 6:
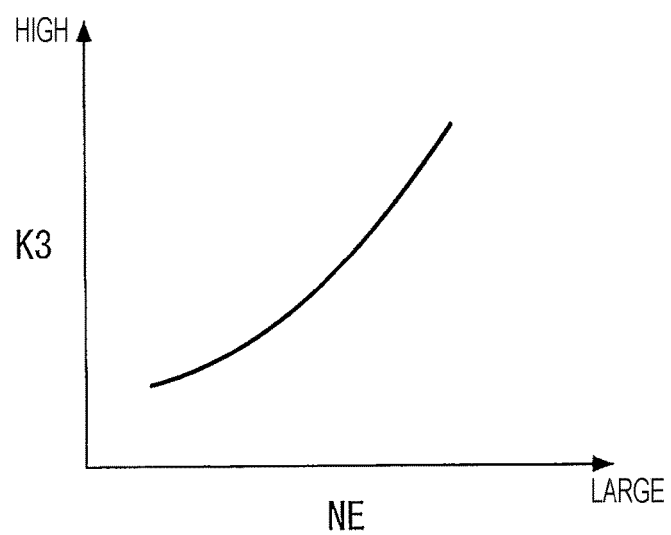
FIG. 6 is an illustration showing an example of a map used for calculating a correction term gain.

If the judgment result in step 18 is YES and the difference between the previous value PTCest(k−1) of the estimated supercharging pressure and the previous value PBest(k−1) of the estimated intake pressure is large, the processing goes to step 19, and a correction term gain K3 (a gain) is calculated by making retrieval from a map shown in FIG. 6 in accordance with the engine speed NE.

As shown in the drawing, the correction term gain K3 is set at a larger value as the engine speed NE is higher. This is because, since the sensitivity of the supercharging pressure with respect to the estimated intake pressure change amount DPB increases as the engine speed NE is higher, the increased sensitivity is reflected on the calculation result of the estimated supercharging pressure PTCest.

Then, the processing goes to step 20, a correction term DPTC (a correction value) is set at a product K3·DPB of the correction term gain K3 and the estimated intake pressure change amount DPB.

In contrast, if the judgment result in step 18 is NO and PTCest(k−1)≈PBest(k−1) is established, the correction term DPTC is not required to be calculated, and it is judged that the calculation should be stopped. The processing goes to step 21 and the correction term DPTC is set at the value 0.

In step 22 subsequent to step 20 or 21, the estimated supercharging pressure PTCest is calculated with Expression (8) as follows. Then, this processing is ended.

$$PTCest(k)=PTCtmp(k)+DPTC(k) \qquad (8)$$

As it is found from Expression (8), since the estimated supercharging pressure PTCest is calculated by adding the correction term DPTC to the temporary value PTCtmp of the estimated supercharging pressure, when PTCest(k−1) PBest(k−1), PTCest(k)=PTCtmp(k) is established. This is because, since PTCest(k−1)≈PBest(k−1) is established, correction is not required for the temporary value PTCtmp of the estimated supercharging pressure.

Referring back to FIG. 2, in step 4, the estimated supercharging pressure PTCest is calculated as described above, then the processing goes to step 5, and WGV control processing is executed. In the WGV control processing, the opening degree of the waste gate valve 11a is controlled (not shown, described later).

That is, when WGV feedback flag F_WGV_FB=1, feedback control is executed on the opening degree of the waste gate valve 11a so that the estimated supercharging pressure PTCest meets the target supercharging pressure PTCobj. In contrast, when WGV feedback flag F_WGV_FB=0, the waste gate valve 11a is held in the full closed state.

In step 5, the WGV control processing is executed as described above, and then the processing is ended.

Figure 7A:
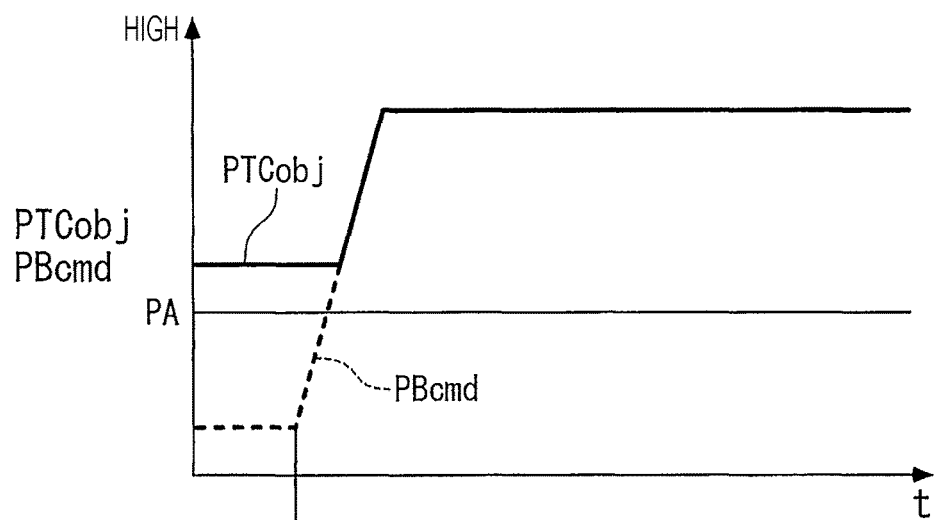
FIGS. 7A and 7B provide timing charts when the intake control processing is executed.
Figure 7B:
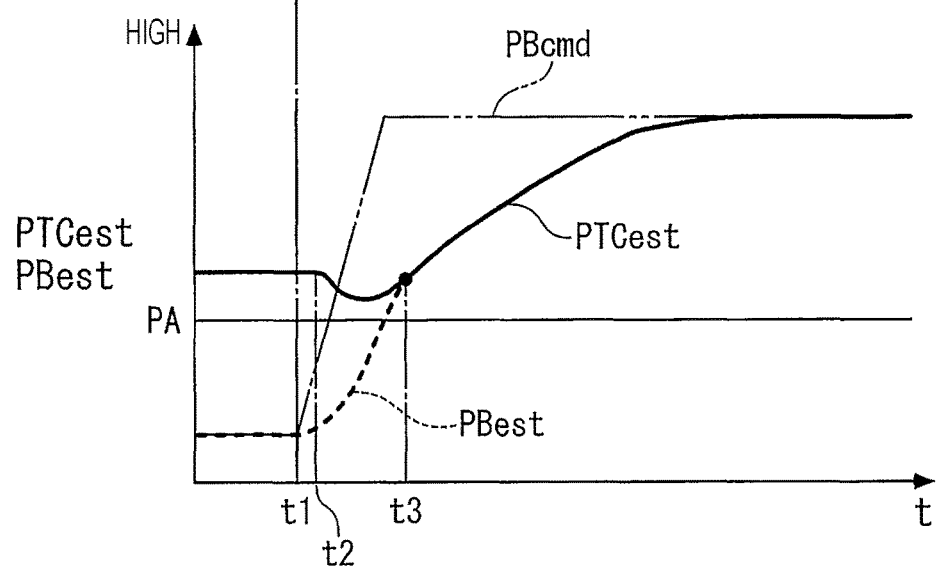

Next, an example of a control result when the above-described intake control processing is executed (hereinafter, referred to as "control result example") is described with reference to FIGS. 7A and 7B. The control result example in the drawing is obtained when an accelerator pedal is depressed under a condition that the waste gate valve 11a is held in the full closed state.

As shown in the drawing, as the throttle valve opening degree TH increases by depression of the accelerator pedal at time t1, both the target intake pressure PBcmd and the estimated intake pressure PBest increase. As the result of that the throttle valve opening degree TH increases, the estimated supercharging pressure PTCest temporarily decreases and then starts increasing although the target supercharging pressure PTCobj is not changed at time t2 and later.

By the progress of control, PTCest≈BPest is established at time t3, and finally, the estimated supercharging pressure PTCest meets the target intake pressure PBcmd.

As described above, with the control device 1 according to this embodiment, if it is estimated that the supercharging pressure equivalent to the target supercharging pressure PTCobj can be realized by controlling the waste gate valve 11a, the steady-state reach supercharging pressure PTCsta is set at the target supercharging pressure PTCobj. If it is estimated that the supercharging pressure equivalent to the target supercharging pressure PTCobj cannot be realized by controlling even the waste gate valve 11a to be in the full closed state, the steady-state reach supercharging pressure PTCsta is set at the closed valve value PTCsta_cl of the steady-state reach supercharging pressure.

Then, by executing the primary delay filtering processing on the thus calculated steady-state reach supercharging pressure PTCsta, the temporary value PTCtmp of the estimated supercharging pressure is calculated. By adding the correction term DPTC to the temporary value PTCtmp of the estimated supercharging pressure, the estimated supercharging pressure PTCest is calculated. When DP2>Djud2 is established and the difference between the previous value PTCest(k−1) of the estimated supercharging pressure and the previous value PBest(k−1) of the estimated intake pressure is large, the correction term DPTC is calculated by multiplying the estimated intake pressure change amount DPB by the correction term gain K3.

In this case, since the estimated intake pressure change amount DPB highly correlates with the change state of the flow rate of the intake gas, the estimated supercharging pressure PTCest can be calculated while reflecting the change state of the flow rate of the intake gas. Accordingly, as compared with Japanese Unexamined Patent Application Publication No. 2005-155506, the calculation accuracy of the estimated supercharging pressure PTCest can be increased. Hence, by controlling the turbocharger 10 with use of such an estimated supercharging pressure PTCest, the supercharging pressure can be accurately controlled, and consequently, the operability and control accuracy of the engine 3 can be increased.

Also, as described above, the correction term gain K3 is calculated as a larger value as the engine speed NE is higher through the map retrieval in FIG. 6. Hence, the estimated supercharging pressure PTCest can be calculated while reflecting the change in the sensitivity of the supercharging pressure with respect to the estimated intake pressure change amount DPB caused by the change in the engine speed NE. The calculation accuracy of the estimated supercharging pressure PTCest can be further increased.

Further, since the correction term DPTC is set at the value 0 when the second pressure deviation DP2 is equal to or smaller than the second judgment value Djud2, as long as PTCest(k−1)≈PBest(k−1) is established, the calculation for the correction term DPTC is stopped when the correction with the correction term DPTC is not required, and hence the unnecessary correction can be omitted. As the result, the arithmetic load can be decreased, and the marketability can be increased.

In addition, the temporary value PTCtmp of the estimated supercharging pressure is calculated by executing the primary delay filtering processing on the steady-state reach supercharging pressure PTCsta being the maximum value of the supercharging pressure that can be attained by the turbocharger 10 in the operating state of the engine 3 and under the condition with the atmospheric pressure PA at the current time point. Hence, the temporary value PTCtmp of the estimated supercharging pressure is calculated as a value that reflects the response delay of the turbocharger 10 when the turbocharger 10 is controlled so that the supercharging pressure meets the steady-state reach supercharging pressure PTCsta. Accordingly, the estimated supercharging pressure PTCest can be calculated while reflecting the response delay characteristic of the turbocharger 10, and the calculation accuracy can be further increased.

The embodiment is the example using the throttle valve mechanism as the flow rate change mechanism. However, the flow rate change mechanism of this application is not limited thereto, and may be merely a configuration that can change the flow rate of the intake gas. For example, a variable intake lift mechanism that can steplessly change the lift of the intake valve may be used as the flow rate change mechanism.

Also, this embodiment is the example using the turbocharger as the supercharger. However, the supercharger of this application is not limited thereto, and may be merely a configuration that can execute the supercharging operation. For example, a mechanical supercharger or an electric turbocharger may be used as the supercharger.

Further, this embodiment is the example using the estimated intake pressure change amount as the flow rate change state parameter. However, the flow rate change state parameter of this application is not limited thereto, and may be merely a value that correlates with the change state of the flow rate of the intake gas by the flow rate change mechanism. For example, if the throttle valve mechanism is used for the flow rate change mechanism, the change amount of the throttle valve opening degree TH may be used as the flow rate change state parameter.

The embodiment is the example using the correction term DPTC being the addition term as the correction value. However, a multiplication factor may be used as the correction value instead of the correction term DPTC.

Also, this embodiment is the example using the second pressure deviation DP2 as the difference between the estimated intake pressure and the estimated supercharging pressure. However, the difference of this application is not limited thereto, and may be merely the difference between the estimated intake pressure and the estimated supercharging pressure. For example, a value (BPest−PTCest) or a value (PTCest−BPest) may be used as the difference.

Further, the embodiment is the example of applying the control device of this application to the internal-combustion engine for the vehicle. However, the control device of this application is not limited thereto, and may be applied to an internal-combustion engine for a ship or an internal-combustion engine for other industrial device.

According to a first aspect of the embodiment, a control device for an internal-combustion engine includes a supercharger (a turbocharger) that can change a supercharging pressure of intake gas, and a flow rate change mechanism (a throttle valve mechanism) that can change a flow rate of the intake gas. The control device includes a basic estimated supercharging pressure calculating unit (an ECU, steps 10 to 15) that calculates a basic estimated supercharging pressure (a temporary value PTCtmp of an estimated supercharging pressure) in accordance with an operating state of the internal-combustion engine; a flow rate change state parameter acquiring unit (the ECU, step 16) that acquires a flow rate change state parameter (an estimated intake pressure change amount DPB) that correlates with a change state of the flow rate of the intake gas by the flow rate change mechanism (the throttle valve mechanism); a correction value calculating unit (the ECU, step 20) that calculates a correction value (a correction term DPTC) in accordance with the flow rate change state parameter (the estimated intake pressure change amount DPB); an estimated supercharging pressure calculating unit (the ECU, step 22) that calculates an estimated supercharging pressure PTCest being an estimated value of the supercharging pressure by correcting the basic estimated supercharging pressure (the temporary value PTCtmp of the estimated supercharging pressure) with the correction value (the correction term DPTC); and a control unit (the ECU, step 5) that controls operation of the internal-combustion engine by using the estimated supercharging pressure PTCest.

With the control device for the internal-combustion engine, the basic estimated supercharging pressure is calculated in accordance with the operating state of the internal-combustion engine, the flow rate change state parameter that correlates with the change state of the flow rate of the intake gas by the flow rate change mechanism is acquired, the correction value is calculated in accordance with the flow rate change state parameter, the basic estimated supercharging pressure is corrected with the correction value, and the estimated supercharging pressure being the estimated value of the supercharging pressure is calculated. Hence, the estimated supercharging pressure can be calculated while reflecting the change state of the flow rate of the intake gas. Accordingly, as compared with the case of Japanese Unexamined Patent Application Publication No. 2005-155506, the calculation accuracy of the estimated supercharging pressure can be increased. Therefore, by controlling the operation of the internal-combustion engine with use of the estimated supercharging pressure, the operability and control accuracy can be increased (it is to be noted that "acquisition of a flow rate change state parameter" in this specification includes calculation for a flow rate change state parameter by a predetermined algorithm and detection of a flow rate change state parameter by a sensor).

According to a second aspect of the embodiment, the control device for the internal-combustion engine described in the first aspect may further include an estimated intake pressure calculating unit (the ECU, step 31) that calculates an estimated intake pressure PBest being an estimated value of an intake gas pressure in an intake manifold of the internal-combustion engine. The flow rate change state parameter acquiring unit may acquire an estimated intake pressure change amount DPB being a change amount of the estimated intake pressure PBest as the flow rate change state parameter, and the correction value calculating unit may calculate the correction value (the correction term DPTC) by calculating a gain (a correction term gain K3) in accordance with a number of rotations NE of the internal-combustion engine and multiplying the estimated intake pressure change amount DPB by the calculated gain (the correction term gain K3).

With the control device for the internal-combustion engine, the estimated intake pressure being the estimated value of the intake gas pressure in the intake manifold of the internal-combustion engine is calculated, the estimated intake pressure change amount being the change amount is multiplied by the gain calculated in accordance with the number of rotations of the internal-combustion engine, and hence the correction value is calculated. In this case, when the number of rotations of the internal-combustion engine is changed, the sensitivity of the supercharging pressure with respect to the estimated intake pressure change amount is changed. Since the correction value is calculated by using the gain calculated in accordance with the number of rotations of the internal-combustion engine, the estimated supercharging pressure can be calculated while reflecting the change in the sensitivity of the supercharging pressure with respect to the estimated intake pressure change amount caused by the change in the number of rotations of the internal combustion engine. Consequently, the calculation accuracy of the estimated supercharging pressure can be further increased.

According to a third aspect of the embodiment, in the control device for the internal-combustion engine described in the first aspect, if a difference (a second pressure deviation DP2) between the estimated intake pressure PBest and the estimated supercharging pressure PTCest is within a predetermined range (DP2 Djud2), the correction value calculating unit may stop the calculation for the correction value, and the estimated supercharging pressure calculating unit may set the estimated supercharging pressure PTCest at the basic estimated supercharging pressure (the temporary value PTCtmp of the estimated supercharging pressure) (steps 18, 21, and 22).

With the control device for the internal-combustion engine, if the difference between the estimated intake pressure and the estimated supercharging pressure is within the predetermined range, the calculation for the correction value is stopped and the estimated supercharging pressure is set at the basic estimated supercharging pressure. By properly setting the predetermined range, if the estimated intake pressure is substantially the same as the estimated supercharging pressure, the calculation for the correction value is stopped, and the unnecessary correction can be omitted. Consequently, the arithmetic load can be decreased, and the marketability can be increased.

According to a fourth aspect of the embodiment, in the control device for the internal-combustion engine described in the first aspect, the basic estimated supercharging pressure calculating unit may calculate the basic estimated supercharging pressure (the temporary value PTCtmp of the estimated supercharging pressure) (step 15) by executing predetermined filtering processing [Expression (5)] for causing a maximum value of a supercharging pressure (a steady-state reach supercharging pressure PTCsta) that can be attained by the supercharger (the turbocharger) in an operating state of the internal-combustion engine and under an environmental condition at a current time point to reflect a response delay characteristic of the supercharger (the turbocharger).

With the control device for the internal-combustion engine, the basic estimated supercharging pressure is calculated by executing the filtering processing for causing the maximum value of the supercharging pressure that can be attained by the supercharger in the operating state of the internal-combustion engine and under the environmental condition at the current time point to reflect the response delay characteristic of the supercharger. Accordingly, the estimated supercharging pressure can be calculated while reflecting the response delay characteristic of the supercharger, and the calculation accuracy can be further increased.

According to a fifth aspect of the embodiment, the control device for the internal-combustion engine described in the first aspect may further include a target supercharging pressure setting unit (the ECU, step 30) that sets a target supercharging pressure PTCobj being a target of the estimated supercharging pressure. The control unit may control the operation of the supercharger (the turbocharger) so that the estimated supercharging pressure PTCest meets the target supercharging pressure PTCobj.

With the control device for the internal-combustion engine, the operation of the supercharger is controlled by using the estimated supercharging pressure calculated with high accuracy as described above. Accordingly, the high control accuracy can be ensured, and consequently, the high operability of the internal-combustion engine can be ensured.

Obviously, numerous modifications and variations of the present invention are possible in light of the above teachings. It is therefore to be understood that within the scope of the appended claims, the invention may be practiced otherwise than as specifically described herein.

What is claimed is:

1. A control device for an internal-combustion engine including a supercharger that changes a supercharging pressure of intake gas, and a flow rate change mechanism that changes a flow rate of the intake gas, the control device comprising:
   a basic estimated supercharging pressure calculating unit that calculates a basic estimated supercharging pressure in accordance with an operating state of the internal-combustion engine;
   a flow rate change state parameter acquiring unit that acquires a flow rate change state parameter that correlates with a change state of the flow rate of the intake gas by the flow rate change mechanism;
   a correction value calculating unit that calculates a correction value in accordance with the flow rate change state parameter;
   an estimated supercharging pressure calculating unit that calculates an estimated supercharging pressure being an estimated value of the supercharging pressure by correcting the basic estimated supercharging pressure with the correction value;
   a target supercharging pressure setting unit that sets a target supercharging pressure being a target of the estimated supercharging pressure; and
   a control unit that controls operation of the supercharger based on the estimated supercharging pressure so that the estimated supercharging pressure meets the target supercharging pressure.

2. The control device for the internal-combustion engine according to claim 1, further comprising:
   an estimated intake pressure calculating unit that calculates an estimated intake pressure being an estimated value of an intake gas pressure in an intake manifold of the internal-combustion engine,
   wherein the flow rate change state parameter acquiring unit acquires an estimated intake pressure change amount being a change amount of the estimated intake pressure as the flow rate change state parameter, and
   wherein the correction value calculating unit calculates the correction value by calculating a gain in accordance with a number of rotations of the internal-combustion engine and multiplying the estimated intake pressure change amount by the calculated gain.

3. The control device for the internal-combustion engine according to claim 1, wherein, if a difference between an estimated intake pressure and the estimated supercharging pressure is within a predetermined range, the correction value calculating unit stops the calculation for the correction value, and the estimated supercharging pressure calculating unit sets the estimated supercharging pressure at the basic estimated supercharging pressure.

4. The control device for the internal-combustion engine according to claim 1, wherein the basic estimated supercharging pressure calculating unit calculates the basic estimated supercharging pressure by executing predetermined filtering processing for causing a maximum value of a supercharging pressure that can be attained by the supercharger in an operating state of the internal-combustion engine and under an environmental condition at a current time point to reflect a response delay characteristic of the supercharger.

5. A control device for an internal-combustion engine, comprising:
   circuitry to
      calculate, in accordance with an operating state of the internal-combustion engine, a basic supercharging pressure of intake gas generated by a supercharger provided in the internal-combustion engine,
      acquire a flow rate change state parameter that correlates with a change state of the flow rate of the intake gas controlled by a flow rate control mechanism provided in the internal-combustion engine,
      calculate a correction value in accordance with the flow rate change state parameter,
      calculate an estimated supercharging pressure of the intake gas by correcting the basic supercharging pressure with the correction value,
      set a target supercharging pressure which is a target of the estimated supercharging pressure, and
      control operation of the supercharger using the estimated supercharging pressure so that the estimated supercharging pressure is substantially equal to the target supercharging pressure.

6. The control device according to claim 5,
   wherein the circuitry is configured to calculate an estimated intake pressure of an intake gas pressure in an intake manifold of the internal-combustion engine,
   wherein the circuitry is configured to acquire an estimated intake pressure change amount which is a change amount of the estimated intake pressure as the flow rate change state parameter, and
   wherein the circuitry is configured to calculate a gain in accordance with a number of rotations of the internal-combustion engine to calculate the correction value by multiplying the estimated intake pressure change amount by the gain.

7. The control device according to claim 5, wherein, if a difference between an estimated intake pressure and the estimated supercharging pressure is within a range, the circuitry is configured to stop calculating the correction value, and the circuitry is configured to set a target supercharging pressure at the basic supercharging pressure.

8. The control device according to claim 5, wherein the circuitry is configured to calculate the basic supercharging pressure by executing filtering process such that a maximum value of a supercharging pressure to be attained by the supercharger reflects a response delay characteristic of the supercharger in an operating state of the internal-combustion engine and under an environmental condition at a current time point.

9. A control method for an internal-combustion engine, comprising:
   calculating, in accordance with an operating state of the internal-combustion engine, a basic supercharging pressure of intake gas generated by a supercharger provided in the internal-combustion engine in accordance with an operating state of the internal-combustion engine, acquiring a flow rate change state parameter that correlates with a change state of the flow rate of the intake gas controlled by a flow rate control mechanism provided in the internal-combustion engine, calculating a correction value in accordance with the flow rate change state parameter, calculating an estimated supercharging pressure of the intake gas by correcting the basic supercharging pressure with the correction value, setting a target supercharging pressure which is a target of the estimated supercharging pressure, and controlling operation of the supercharger using the estimated supercharging pressure so that the estimated supercharging pressure is substantially equal to the target supercharging pressure.

* * * * *